Feb. 4, 1969     H. Y. MINAS     3,425,772
METHOD FOR TESTING THE SENSITIVITY OF EYES TO LIGHT
Filed Oct. 7, 1966
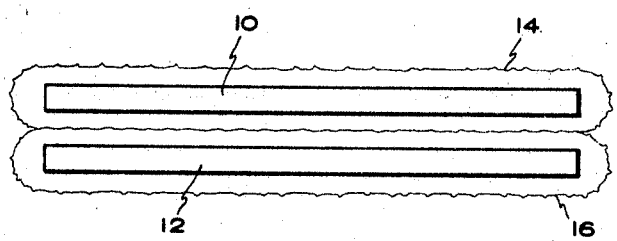
FIG. 1.
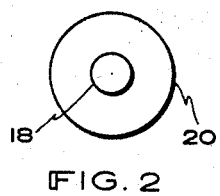
FIG. 2
FIG. 3
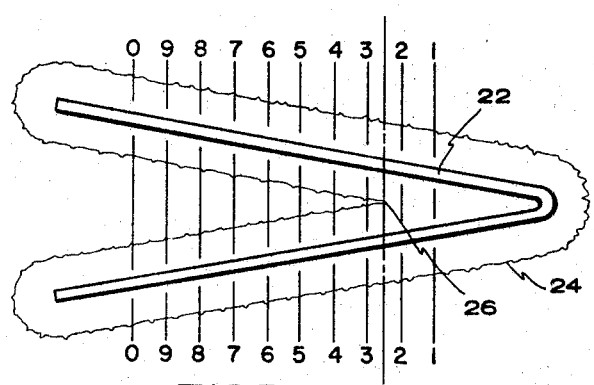
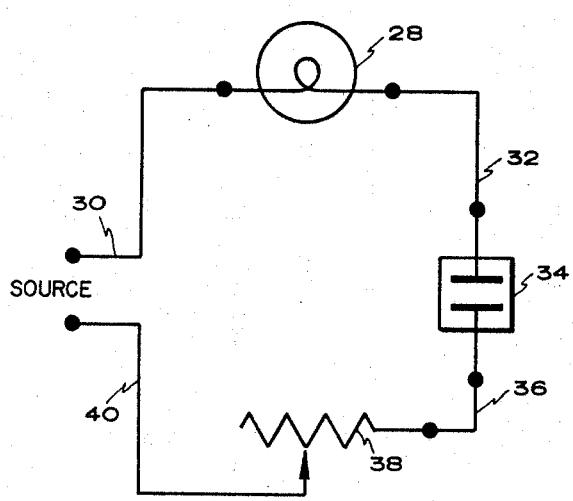
FIG. 4
FIG. 5
INVENTOR.
HAROLD Y. MINAS
BY C. Harvey Field
HIS ATTORNEY

United States Patent Office 3,425,772
Patented Feb. 4, 1969

3,425,772
METHOD FOR TESTING THE SENSITIVITY OF EYES TO LIGHT
Harold Y. Minas, 2201 23rd Ave., Sacramento, Calif. 95822
Continuation-in-part of application Ser. No. 488,177, Sept. 17, 1965. This application Oct. 7, 1966, Ser. No. 585,011
U.S. Cl. 351—39
Int. Cl. A61b 3/06
3 Claims

ABSTRACT OF THE DISCLOSURE

A method for testing the sensitivity of eyes to light which includes the steps of exposing the eyes of an individual to a light source and varying the intensity of the source until the observed periphery of the retinal irradiation of the source has moved to a predetermined position at which point the observed retinal irradiation is a measurement of the sensitivity of the individual's eyes to light. A plurality of spaced light sources can be observed by the individual and the intensity of said sources increased until the retinal irradiation from the sources merge. Darkened lenses can be prescribed for the individual based on the intensity of the sources at the time of merger.

---

This is a continuation-in-part of my copending United States patent application Ser. No. 488,177, filed Sept. 17, 1965, now abandoned.

This invention relates to a method for determining an individual's tolerance or sensitivity to light, and in particular, to a retinal irradiation method for determining an individual's sensitivity to light in order to select tinted lenses.

It is an established practice for ophthalmologists, optometrists, and opticians to prescribe the use of glasses having tinted or colored lenses. It is well known in the art of prescribing glasses of this type that some individuals require lenses having low light transmitting characteristics, whereas other individuals, who are subjected to similar light conditions, are best fitted with lenses having high light transmitting characteristics. Heretofore, the selection of the tint of the absorptive lenses was based entirely upon a series of subjective tests. Accordingly, it has been found that individuals are often dissatisfied with light absorptive spectacles, such as sunglasses, since the lenses thereof have light transmitting characteristics which are not suited to the eyes of the individual. Attempts have been made to provide objective tests to overcome this problem. However, because of the great variations between individual patients, none of the aforementioned attempts have been successful.

Accordingly, it is an object of the instant invention to provide a method for determining an individual's tolerance to light, which method overcomes the objections and disadvantages heretofore found in such methods.

Another object of my invention is to provide an objective test for determining the sensitivity or tolerance of an individual to light, which test may be used to aid in the proper selection of tinted lenses.

Still another object of my invention is to provide a method to aid in the proper selection of tinted lenses which is simple to follow and easily learned by technicians.

A still further object of the instant invention is to provide a retinal irradiation method for determining an individual's tolerance to light.

A still further object of my invention is to provide a method for determining a person's sensitivity to indoor light and outdoor light.

Still other objects and attendant advantages of my invention will become apparent to those skilled in the art as the invention is better understood by reference to the detailed description appearing hereinafter.

The foregoing objects and attendant advantages may be achieved by measuring an individual's tolerance to light by exposing the face of said individual to a light source. The intensity of said light source is then increased until the individual being tested indicates that a predetermined retinal irradiation has occurred. The examiner observes the intensity of said light source when said predetermined retinal irradiation occurs and selects tinted spectacles for said patient according to the observed intensity. In another embodiment of my invention the individual's tolerance to light is determined by exposing said individual's face to a light maintained at a predetermined intensity. The patient is provided with means for determining the extent of retinal irradiation which he observes from said light source and the examiner thereupon selects properly tinted spectacles from this information. In the most preferred embodiment of my invention the light source is maintained in a darkened enclosure to provide uniform measuring conditions for testing different individuals.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

FIGURE 1 is a view, as seen by a patient being tested, of one type varying intensity light source which is used according to the method of my invention.

FIGURE 2 is another type of variable intensity light source for determining the sensitivity of an individual's eyes to light.

FIGURE 3 is a constant intensity light source with indicia for measuring the retinal irradiation observed from said light source.

FIGURE 4 is a schematic wiring diagram of a circuit which may be used to activate the light source of my invention.

FIGURE 5 is one type of empirical chart which can be used to convert retinal irradiation readings obtained according to the method of my invention to lens tint.

It is well known that when the intensity of a source of light is increased the periphery of said source appears to increase when viewed by a person with unprotected or unshielded eyes. This phenomenon is known as retinal irradiation or a change in contour or size. Such retinal irradiation also occurs when a person observes a flickering or flashing light. The observer of such a light sees said light not only at such times as it is actually flashing but he also sees the light's irradiation, i.e., the period during which the light is apparently observed is greater than the period during which the light is actually illuminated. As the intensity of the flickering light is increased, the light's irradiation is increased until the point is reached at which the observer no longer sees a flickering. This point is called the critical flicker frequency (C.F.F.) of the light. I have found that the extent of such retinal irradiation observed by one person differs from that observed by another person viewing the same light source because of the difference in pupil size and state of retinal adaption of the eyes of each individual observing the light. Since the pupil size and state of retinal adaption of the eyes are the major factors which are considered in fitting an individual with tinted glasses the retinal irradiation observed by an individual can be used in prescribing sunglasses and tinted prescription lenses.

In using retinal irradiation for prescribing tinted lenses or glasses, an individual to be tested is shown a light source and the retinal irradiation observed by said individual is determined. This irradiation is then equated to lens tint or color by using an empirical conversion chart such as the chart shown in FIGURE 5, i.e., retinal irradiation is equated directly to lens tint. Said conversion chart may be obtained by running a series of retinal irradiation examinations on individuals having a known retinal adaption, i.e., on individuals who have been properly fitted with tinted lenses. The retinal irradiation observed by the tested individuals is then equated to the tint in their spectacles. A second method which may be followed to make such an empirical conversion chart is to run a series of examinations on individuals under uniform light intensity conditions. The retinal irradiation observed by each of the individuals is then listed in ascending or descending order with the individual observing the greatest retinal irradiation being assigned the darkest lens tint and the person observing the least retinal irradiation being assigned clear lenses. Persons observing retinal irradiation falling between the maximum and minimum irradiations are assigned lenses which are tinted in an amount which is proportional to the position of the person's observed retinal irradiation with respect to the previously mentioned maximum and minimum irradiations. For example, in the chart shown in FIGURE 5, a retinal irradiation of 5 indicates that an individual should have a lens tint one-half as dark as a person that observes a retinal irradiation of 10.

FIGURES 1 through 3 illustrate various light source arrangements which may be used to test the retinal adaption of an individual, i.e., to determine the retinal irradiation observed by the individual. FIGURE 1 shows elongated light sources 10 and 12. When said sources are illuminated, light irradiates outwardly therefrom to form light peripheries 14 and 16. As the intensity of said sources 10 and 12 is increased, said peripheries 14 and 16 move outwardly away from the sources until periphery 14 of source 10 and periphery 16 of source 12 meet between said sources. When this occurs, sources 10 and 12 appear to be one single light source. Accordingly, a light source of this type may be used to determine an individual's retinal irradiation by having said individual observe sources 10 and 12 while the intensity of said sources is increased. When it appears that the sources have merged the individual being tested immediately notifies the examiner who in turn records the intensity of said sources 10 and 12 at the time of their apparent merger. This intensity is equivalent to the observed retinal irradiation of the individual being tested. FIGURE 2 shows another type of varying intensity light source which can be used in the method of my invention. As shown, a single point source 18 is used with circle 20 provided about said source. As in the case of sources 10 and 12, the intensity of said source 18 is increased until it appears that the periphery of said source coincides with circle 20. At this point, the individual being examined notifies the examiner whereupon he records said intensity and equates it to lens tint.

In both FIGURES 1 and 2 the light sources shown are variable intensity ones. The light source shown in FIGURE 3 is a constant or fixed intensity source which is adapted to provide the examiner with sufficient retinal irradiation information to enable him to prescribe tinted lenses. As shown in said FIGURE 3, V-shaped light source 22 is provided with the sides of said V forming an angle with each other of about 1 to 30 degrees and preferably about 3 to 20 degrees. Said light source 22 is then scaled into equal divisions made along planes which are substantially perpendicular to the line which bisects said V shaped source. The light from source 22 irradiates outwardly therefrom to form periphery 24 which at any given source intensity forms apex 26 within said V shaped source 22. The individual being examined observes the position of said apex 26 and notifies the examiner of this position. For example, in FIGURE 3, said apex 26 is positioned between divisions 2 and 3. This arbitrary number then represents the relative retinal irradiation viewed by the individual being examined and is transferred to a conversion chart which allows the examiner to convert said retinal irradiation to lens tint.

As previously indicated, retinal irradiation also occurs when an individual observes a flickering light. FIGURE 4 illustrates one type of circuit which may be used to provide a flickering source which in turn can be used to determine retinal irradiation according to the method of my invention. As shown, light source 28 is connected to a source of current which current passes along line 30 to said source 28. From thence said current passes along line 32 to variable speed relay switch 34, which switch may be held in a closed position to allow light source 28 to burn continuously or said switch may be periodically opened and closed to flicker said light source 28. In addition, said variable speed rotary switch 34 may be adjusted to increase or decrease the flickering of light source 28. From said switch 34 current flows along line 36 to potentiometer 38, which is used to vary the intensity of light source 28, and from thence said current flows back to its source along line 40. It is to be noted that while the circuit shown in FIGURE 4 is preferably adapted to be used to provide a flickering light source, when switch 34 is locked shut said circuit may also be used to activate sources 10, 12, 22 and 18 according to the fashion heretofore described.

A flickering light source may be used in several ways to determine the retinal irradiation observed by an individual. For example, the speed of the flickering source may be held constant while the intensity of said source is increased. When the individual observing said source can no longer observe any flickering he notifies the examiner who in turn records the intensity at which said flickering appears to stop. This intensity, as previously described, is directly proportional to retinal irradiation which in turn is related to lens tint. A second method for determining such irradiation is to maintain light source 28 at a constant intensity while increasing the rate of flicker of said source. When the person viewing said source 28 no longer observes such flickering the examiner is notified and he thereupon records the rate of flicker, which rate is also directly proportional to the retinal irradiation observed by the individual.

So that the examining conditions are the same for each individual being tested according to the method of my invention, it is generally necessary to position the light source in a location wherein the light surrounding said light source remains substantially uniform each time said method is performed. Accordingly, it is preferable to house my light source in a dark enclosure. Preferably, the only light within said enclosure should be that light which is emitted by the light sources of my invention.

In practicing the method of my invention the individual to be tested is positioned to look directly at a source of light of the type described. As indicated, the source is generally provided within enclosure means to maintain substantially uniform ambient light conditions. It is also to be noted that the light source observed by the individual may be the reflected image of said source, i.e., the individual looks at a mirror which is positioned to enable said individual to see a light source positioned away from said mirror. Depending on the type of light source viewed, the individual either indicates when a predetermined retinal irradiation occurs or he advises the examiner of the observed retinal irradiation, i.e., when a variable intensity source is observed the individual notifies the examiner when a predetermined retinal irradiation occurs and when a constant intensity light source is viewed the individual advises the examiner of the observed retinal irradiation. The examiner then converts the retinal irradiation reading to lens tint or color through the use of an empirical chart of the type described. It is often desirable to run several tests on each individual and obtain an average retinal irradiation reading which is used to select the proper tint. By using the method of my invention, it is also possible to determine whether a person should use tinted lenses in spectacles which are used under inside light conditions as well as outside light conditions. To make an inside light determination, a light source is viewed which is substantially equivalent to the inside light viewed by the individual being tested. If the retinal irradiation observed by the tested individual is greater than a predetermined amount under light conditions of this type, the individual generally requires indoor tinted lenses.

It is to be noted that the phrase "light source" as used in the foregoing description and in the claims refers to any single source of light or any plurality of such sources arranged in any configuration or relationship. It is further noted that in the preferred embodiment of my invention I prefer to use a light source with an intensity that remains constant for any set voltage applied to said light source. The term "lenses" as used in the foregoing description and in the claims refers to any type of lenses used by an individual in combination with his eyes such as corrective lenses, e.g., contact lenses, spectacles, etc., or sunglasses. The phrase "tinted lenses" as used in the foregoing description and in the claims refers to any lenses that are colored or otherwise treated in any fashion to modify or control their light transmitting characteristics.

Whereas there is here illustrated and specifically described a certain preferred construction and method which are presently regarded as the best modes of carrying out the invention, it should be understood that various changes may be made and other steps adopted without departing from the inventive subject matter particularly pointed out and claimed.

I claim:
1. A method for measuring the sensitivity of an individual's eyes to light which comprises:
  (a) exposing the eyes of said individual to a light source whereby the periphery of the retinal irradiation from said source is observed at a first position; and
  (b) varying the intensity of said source until said periphery has moved to a predetermined position spaced apart from said first position wherein the intensity of said source when said periphery is positioned at said predetermined position is a measurement of the sensitivity of said individual's eyes to light.

2. The method of claim 1 wherein said individual being tested views a first light source and a second light source spaced apart from said first light source and the intensity of said first and said second light sources in increased until the retinal irradiation observed from said sources merge together.

3. The method of claim 1 wherein said individual being tested views parallel spaced elongated light sources and the intensity of said sources is increased until the peripheries of the retinal irradiation from the sources merge together.

References Cited

UNITED STATES PATENTS

| 2,209,728 | 7/1940 | Higley | 351—36 X |
| 2,495,708 | 1/1950 | Draeger et al. | 351—17 X |
| 2,916,963 | 12/1959 | Bouman | 351—17 |

OTHER REFERENCES

Glenn A. Fry and Mathew Alpern: "The Effect of a Peripheral Glare Source upon the Apparent Brightness of an Object," Journal of the Optical Society of America, vol. 43, No. 3, March 1953 pp. 189–195.

DAVID SCHONBERG, *Primary Examiner.*

PAUL A. SACHER, *Assistant Examiner.*

UNITED STATES PATENT OFFICE
CERTIFICATE OF CORRECTION

Patent No. 3,425,772                      February 4, 1969

Harold Y. Minas

It is certified that error appears in the above identified patent and that said Letters Patent are hereby corrected as shown below:

Column 6, line 14, "in" should read -- is --.

Signed and sealed this 21st day of April 1970.

(SEAL)
Attest:

Edward M. Fletcher, Jr.                WILLIAM E. SCHUYLER, JR.
Attesting Officer                      Commissioner of Patents